United States Patent [19]

Ounsted et al.

[11] 3,988,079
[45] Oct. 26, 1976

[54] TWO-PIECE ROTOR FOR WANKEL ENGINES

[75] Inventors: Edwin J. Ounsted, Dearborn; George T. Luzanski, Monroe; Robert W. Gardner, Birmingham; Thomas E. Crowley, Livonia, all of Mich.

[73] Assignee: Ford Motor Company, Dearborn, Mich.

[22] Filed: Oct. 3, 1974

[21] Appl. No.: 511,864

[52] U.S. Cl. .......................... 418/61 A; 29/156.4 R; 228/240
[51] Int. Cl.² ..................... F01C 1/02; B23P 15/10; B23K 1/04
[58] Field of Search ............... 418/61 A, 61 B, 270; 123/8.01; 29/156.4 R; 228/238, 239, 240, 263

[56] References Cited
UNITED STATES PATENTS

| | | | |
|---|---|---|---|
| 3,059,585 | 10/1962 | Froede et al. | 418/61 A |
| 3,799,706 | 3/1974 | Bilobran | 418/61 A |

OTHER PUBLICATIONS

*Brazing Manual*, pp. 122–123, American Welding Society, 1955.

Primary Examiner—C. J. Husar
Assistant Examiner—Leonard Smith
Attorney, Agent, or Firm—Joseph W. Malleck; Keith L. Zerschling

[57] ABSTRACT

A unique two piece rotor construction and method of fabrication is disclosed. The rotor is cast in split positions (bifurcated along a central plane) by a shell molding or high pressure green sand technique. The portions have special pairs of interfitting mating faces, at least one being generally radially directed and at least one being generally axially directed. After the cast portions have said interfitting faces machined to a predetermined finish, and cleansed. The portions are assembled in a fixture with flux and braze material between said faces. The assembly is heated in a controlled atmosphere furnace to complete the brazed bond between said faces.

2 Claims, 5 Drawing Figures

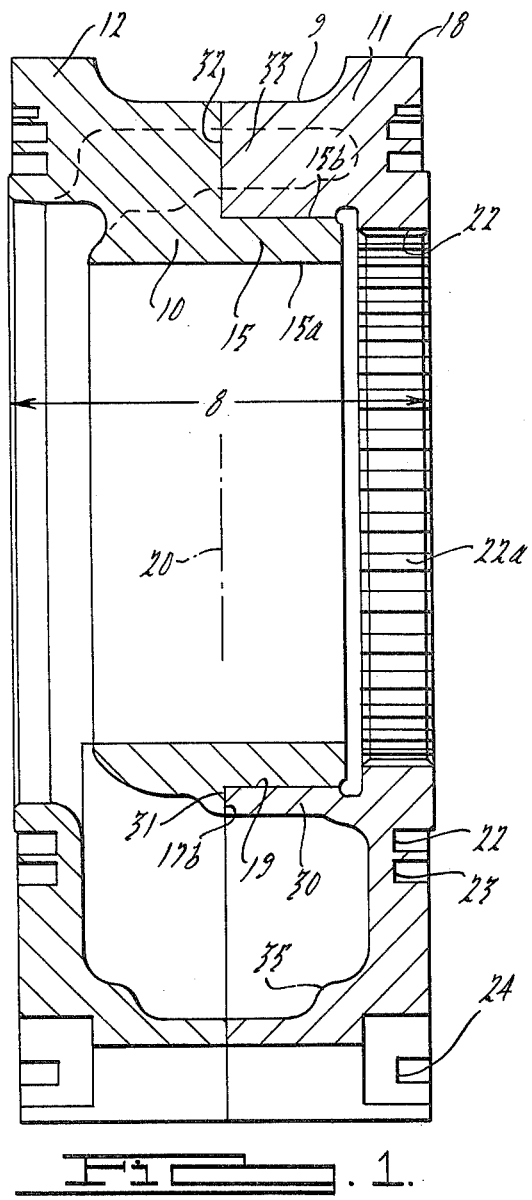
FIG. 1.
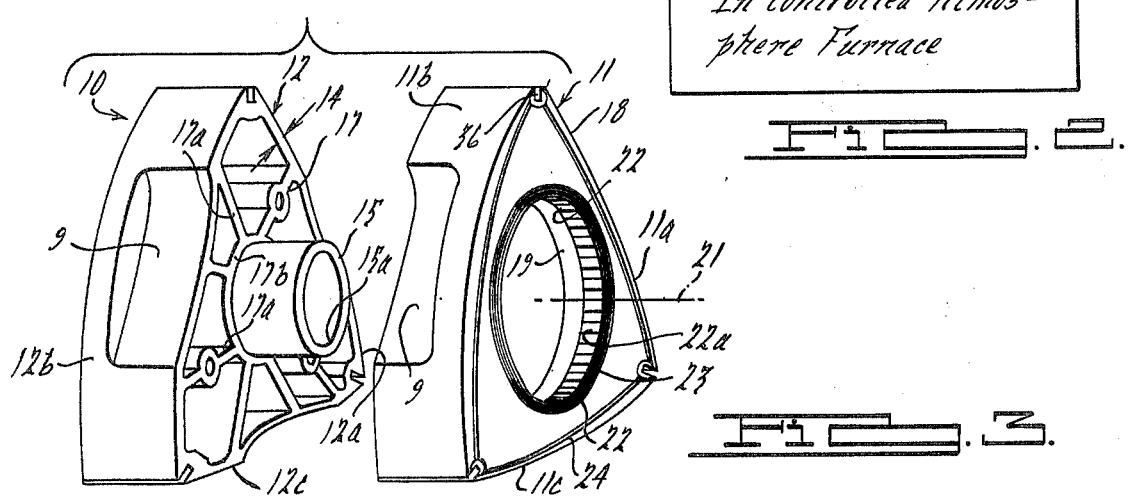
FIG. 2.
FIG. 3.

TWO-PIECE ROTOR FOR WANKEL ENGINES

BACKGROUND OF THE INVENTION

Heretofor, the rotor for a rotary internal combustion engine typically has been fabricated as a single unit and has proved to be a rather complicated part. The complexity results in part from the fact that the rotor must be made hollow to accommodate a cooling medium fluid, such as oil or combustion intake charge and at the same time provide intricate shapes for purposes of structural strength, grooves for sealing elements, and combustion pockets in the triangulated outer peripheral wall of the rotor. Commercial versions of rotors have been typically formed of cast iron produced by conventional sand casting techniques. This has resulted in a raw or gross casting weight for the rotor of approximately 110 lbs. for a typical application to be used in a multi-rotor 200 horsepower engine. Unfortunately, much of this weight is trimmed as it constitutes risers, sprues, and ingate system, all being parasitic elements formed by the sand casting technique. In fact, approximately 90 lbs. is removed leaving the net casting rotor weight in the range of approximately 30 lbs. This is disadvantageous because the casting yield is very low and the cost of fabrication is high. The cost penalty is particularly severe since rotors have been formed of nodular cast iron, the preparation of which requires a nodularizing agent, such as magnesium, which deteriorates quickly after addition and the excess cast material cannot be recycled conveniently.

Some attempts by the prior art to simplify or introduce new methods of making the rotor for a rotary internal combustion engine have comprised: (a) use of powder metallurgy to make the rotor in parts, the parts being joined together to make a complete assembly, and (b) the use of drop forged parts which can be assembled to form a complete assembly such as by welding or other metal joining techniques including fasteners. The powder metallurgy technique has not been particularly successful for the reason that the various columns and ribs within the internal structure of the rotor must be made unusually thick as dictated by powder compression techniques; accordingly, the desire to reduce weight is not fully realized because of the contrary influence of increasing the internal webbing structure.

For forged parts, a draft to outer and inner walls is imparted by the forging operation; welding of the parts is restricted to the outer periphery of the mated assembly due to access; this necessitates special bisecting supporting walls for the inner periphery. This adds weight unnecessarily to the structure. Such a fabricated rotor will have a tendency to deteriorate because of high stresses on the outer peripheral wall which are not supported by a solid fabrication at the hub or inner periphery. The use of either forgings or powdered parts has not been attempted seriously for production because of the additional disadvantage that teeth must be formed on a portion of the rotor to cooperate as part of the timing mechanism for the engine; this results in undercut areas which cannot be fabricated by these techniques.

SUMMARY OF THE INVENTION

The primary object of this invention is to provide an improved apparatus and method for a rotor of a rotary internal combustion engine, the rotor being particularly formed of nodular cast iron and characterized by (a) reduced internal defects as a result of a fabrication, (b) lower cost of fabrication and improved yield of forming the rotor and (c) elimination of complex coring required to define the internal passages and chambers of the rotor.

Another object of this invention is to provide a rotor assembly which is comprised of interfitting metallic body portions, each having a pair of faces effective to mate with the pair of faces on the other portion. One face of each pair is comprised of at least one radially extending flat surface, each lying on a common radial plane; another face of each pair has at least one axially extending cylindrical surface. The mating surfaces are joined together by a diffused metal bond, particularly a brazed material.

Particular features pursuant to the method aspect is the preparation of interfitting or nesting body portions for the rotor assembly, the body portions being formed by a precise casting technique characterized as shell molding, whereby peripheral wall sections are defined in such thin sections that they are beyond the technological level of conventional casting techniques. The mating surfaces are of two varieties, one cylindrical and the other a radiating flat plane, each pair of mating surfaces being joined together by a brazed material inserted therebetween in the form of foil, preforms or pellets which permit the interfitted assembly to be subjected to a furnace atmosphere for providing a metallic molecular bond therebetween. The method utilizes nodular cast iron which, by virtue of the method, will have a yield of at least 50% better than that capable of being produced by the prior art and thereby resulting in much lower fabricating costs.

SUMMARY OF THE DRAWINGS

FIG. 1 is a central sectional view of a completed assembly according to this invention, said sectional view being taken substantially along line 1—1 of FIG. 4;

FIG. 2 is a schematic flow diagram of the method embodying the principles of this invention;

FIG. 3 is a schematic perspective view showing the interfitting metallic body portions in an exploded condition;

DETAILED DESCRIPTION

Figure 4:
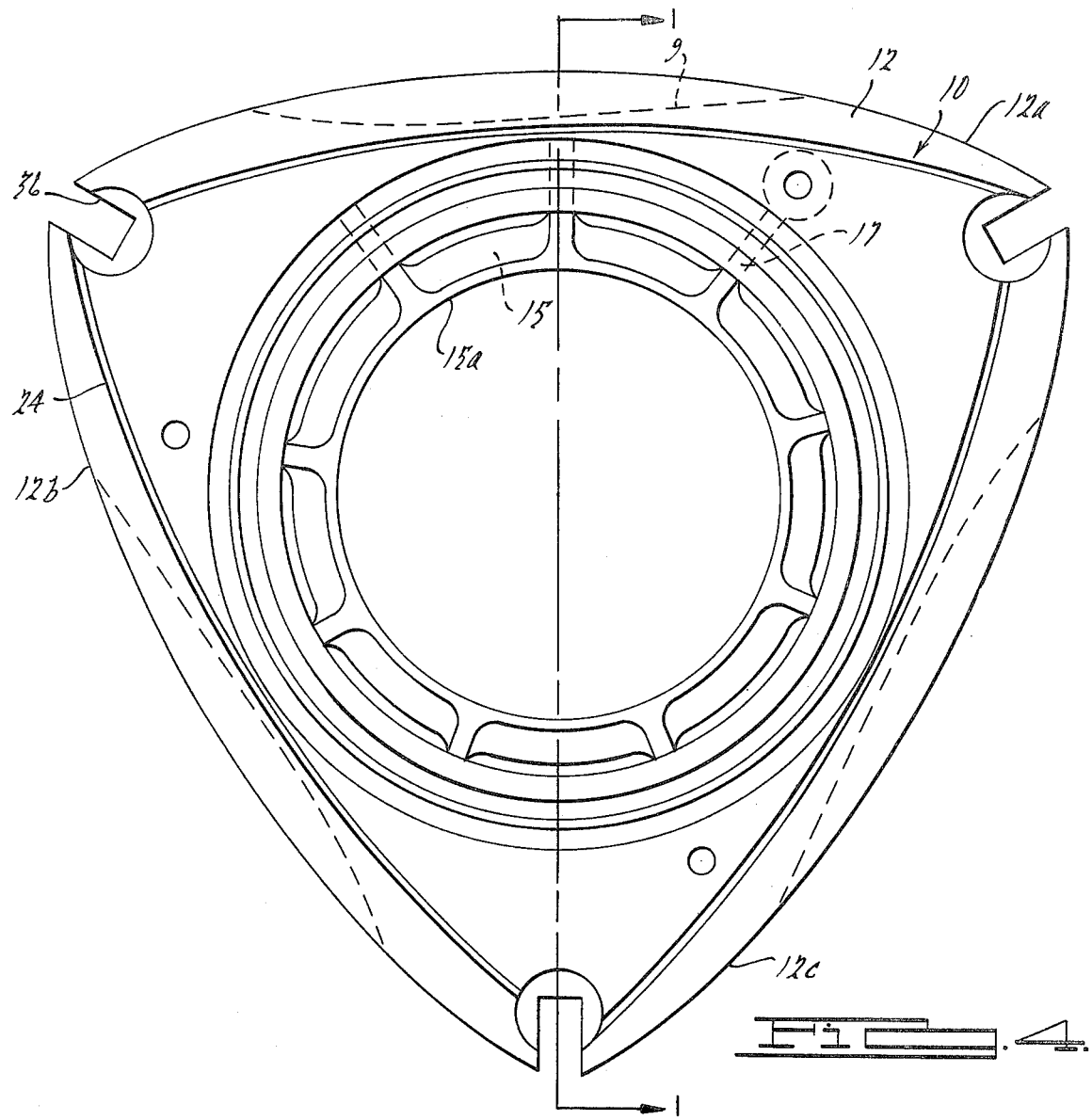
FIG. 4 is an elevational view of a rotor embodying the principles of this invention.
Figure 5:
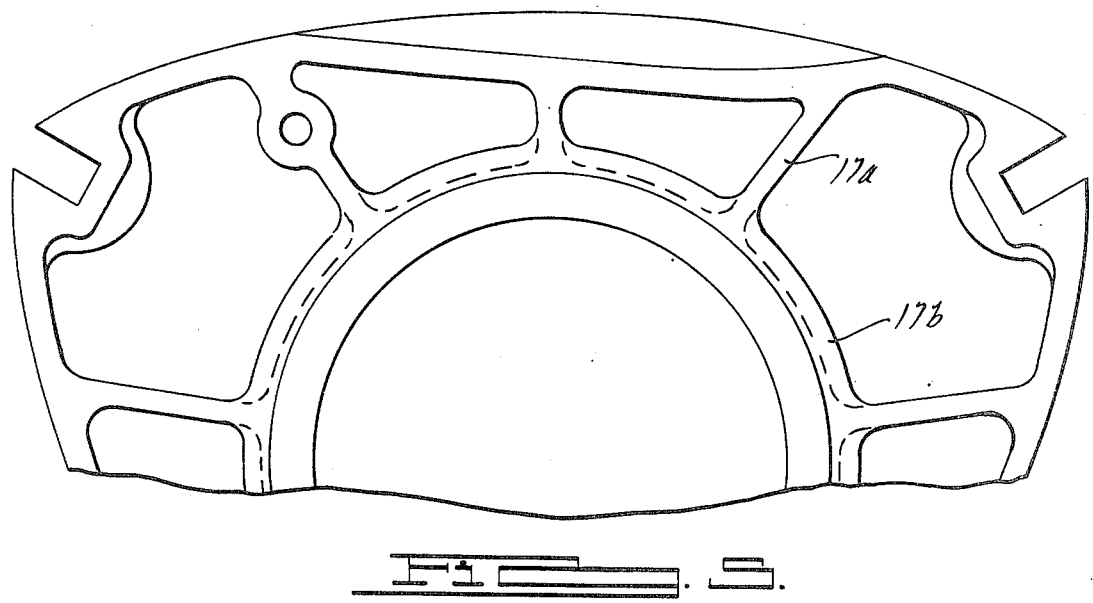
FIG. 5 is a fragmentary elevational view of the opposite side of the structure of FIG. 4.

The completed rotor assembly, as shown in FIGS. 1 and 3, comprise a pair of metallic body portions or castings 10 and 11, each having a triangulated peripheral outer wall 12 and 18 respectively; the outer walls have a predetermined wall thickness 14 (see FIG. 3). The outer wall is generally divided into three accurate segments, such as 12a, 12b, 12C; each contain a predetermined pocket configuration 9, which cooperates to define a predetermined compression ratio for the engine. Body portion 10 has a pair of mating surfaces, the first of which is carried by a radially inwardly located cylindrical wall 15 with an outer cylindrical surface 15b and surface 15a which extends substantially across a major portion of the width 8 of the rotor. Surface 15b constitutes the first of said mating surfaces; flat surface 17a on each rib 17 or stepped flat surface 17b on the wall 15, constitute the second of the mating surfaces.

Radiating ribs 17 extend between the outer peripheral wall 12 and the inner cylindrical surface 15a at spaced circumferential locations thereabout.

Body portion 11 has, of course, a complimentary defined and almost identical outer peripheral wall 18, being the mirror image of that on body portion 10. A radially inwardly located cylindrical wall 30 having surface 19 considered the first of a pair of mating surfaces; surface 19 is adapted to interfit within the exterior surface 15b of wall 15 of body portion 10. The body portion 11 has radially extending flat surfaces 32 on the inner side of ribs 33, either constituting the second of the pair of mating surfaces on portion 11. The mirror image is taken with respect to a central bisecting plane 20 perpendicular to the axis 21 of the rotor. Body portion 11 also has, at one side, a recessed annular cylindrical surface 22 containing preformed teeth 22a circumferentially spaced thereabout; the teeth forms a ring gear which cooperates as a part of the timing mechanism for controlling the movement of the rotor with respect to the eccentric shaft of the engine (not shown).

Intricate contours are defined in the various outer walls and inner walls of the rotor portions, such as the grooves 22, 23 and 24, intricate depressions or pockets 9 in the faces of the rotor, and irregular interior surfaces 35. Slots 36 are formed in the apices of both portions for receiving an apex seal assembly which may have spring assemblies for biasing the apex seal into contact with the trochoid wall of the engine housing. Various cast flanges and webbing structures are provided in the hollow interior of the rotor, some for purposes of scooping and slinging oil throughout the interior of the rotor, particularly into the spaces adjacent the apices of the rotor.

To prepare and fabricate a rotor having said aforesaid structural and configuration requirements, as well as material requirements, the method schematically shown in FIG. 2 has been developed and comprises essentially four steps: (1) preparation of the shell mold cast interfitting body portions or castings with defined interfitting faces and thin peripheral wall, (2) machine and cleansing of the interfitting faces, (3) application of flux and deposition of braze material onto the interfitting faces, and (4) assembly and interfitting of the rotor portions with the brazed material between said mating surfaces heating said assembly in a controlled atmosphere furnace.

In Step 1, the interfitting body or castings are formed critically of nodular cast iron and by a shell molding casting technique, although high pressure green sand casting may be employed at times. Shell molds are used widely for casting engine crankshafts and camshafts rapidly and efficiently. Their ability to cast controlled sections is important to the present invention. Each mold is made with shell portions comprised of rigidized molding material, such as sand and binder mixture heated to rigidity by a heated pattern. There will be at least two shell portions required for each of the main body portions to be separately molded. The heated pattern cures the molding material upon contact, particularly in the immediate vacinity of the pattern, to form a thin wall structure containing at least part of the cavity for making the desired casting. The cured molding material may roughly conform to the shape of the cavity on its exterior. After completely curing the shell portions, they are lifted off the pattern and assembled into a mold by attaching the various portions together.

The mold then is placed in a flask and the space surrounding the mold is filled with metal shot to provide sufficient strength for the mold during the casting operation. Conventional practice has been to form shell portions in duplicate halves and attach the halves to each other by clips around the outside edge or by bonding. An improved method is to use projecting elements formed on the exterior of each of the shell portions in a manner such that the projecting elements serve as force receiving members.

In this first step, it is most critical that the particular type of interfitting faces are defined according to this invention. Radially extending flat surfaces, preferably on a common radial plane, are defined. In FIGS. 1 and 3, these first interfitting surfaces are represented at 17a, 17b, 31 and 32. The second interfitting surfaces are represented at 15b and 19. These pairs of interfitting surfaces are at right angles to each in the preferred embodiment. Surface 19 slides onto surface 15b, until surfaces 31 and 32 abut with surfaces 17a and 17b. It should be noted that the interfitting surfaces occur both on the interior, typically at inaccessable portions of the rotor, as well as at the outer regions which are typically accessible. However, the inaccessible interfitting surfaces offer no problem to this invention since predeposited braze material is used.

One of the virtues of using this method is that the outer peripheral wall of the rotor, which faces most directly the variable combustion chambers of the engine, can be made of a predetermined thickness which is considerably thinner than that capable by the prior art. For purposes of this invention, the wall thickness 14 should be about or in the range of 0.140 inches and within a precise dimensional tolerance thereof within 0.02 inches. Furthermore, by the use of the shell mold process for defining the body portions, conventional coring, typically used in sand casting techniques, is eliminated. The latter removes some of the problems limiting the interior configuration of the rotor since coring must be inserted as well as removed after the casting is completed according to the prior art.

The two-piece casting approach, as well as the combined use of the shell mold technique for precise dimensional control, increases casting integrity by eliminating internal defects. The considerable amount of cast material which normally goes into risers and gating must be trimmed following casting according to the prior art, is substantially eliminated with this invention. Therefore, the casting yield is at least increased by 50% over other sand mold casting techniques.

In Step 2, the interfitting faces surfaces are machined to approximately 125/200 r.m.s. surface finish. Such faces are electrolytically cleaned in a molten salt bath by alternating oxidation and reduction. The salt bath may preferably contain a commercial mixture of Kolene K-4 (Kolene Corp.).

In Step 3, a typical commercial copper flux (boric acid base) is applied by spray, roller or brush to the interfitting faces. Braze material in the form of a copper alloy, preferably consisting essentially of about 60% copper, 25% zinc, 10% nickel and 5% tin; the alloy has a liquidus at about 1560°–1570° F and flows at about 1600°–1650° F. It is inserted onto one of the interfitting faces. The braze material may be in the form of foil, external preforms or internal pellets. In any of these forms, the braze material is arranged so that it will be sandwiched between the interfitting faces when the body portions are assembled together.

In Step 4, the body portions are assembled and interfitted together in a fixture assembly with the braze material sandwiched therebetween. The fixture and body portions are inserted into a controlled atmosphere furnace maintained at a temperature level of approximately 1650° F; the fixture is subjected to heat of at least 1600° F for a period of time about 15 minutes (appropriately 10–20 minutes), depending upon the temperature needed to fully braze the alloy that is utilized, and thus causing the braze material to diffuse and molecular join with said body portions.

We claim as our invention:

1. A rotor assembly for a rotary internal combustion engine, the rotor being adapted to planetate about an axis of the engine, the apparatus comprising:
   a. interfitting mating metallic body castings, each comprised of nodular cast iron, each casting having complimentary mating faces which are constituted of at least one radially extending flat surface and of at least one axially extending cylindrical surface, each casting having a wall thickness throughout which is about 0.140 inches, and
   b. braze material joining said complimentary mating faces together to provide a rigid diffused metal bond therebetween, said material consisting of a copper alloy consisting essentially of about 60% Cu, 25% Zn, 10% Ni and 5% Sn, which alloy has a liquidus at about 1560°–1570° F and flows at about 1600°–1650° F, which alloy is diffused into both of said mating surfaces.

2. A method of making a hollow rotor for a rotary engine comprising the steps of:
   a. preparing interfitting body castings comprised of nodular cast iron, said castings being molded with each having a triangulated peripheral outer wall, a cylindrical inner wall and a side wall connected principally to at least said peripheral outer wall at one side, said casting preparation being carried out by a shell molding process whereby the outer peripheral wall is defined within a precise dimensional tolerance within .020 inches, each of said body castings having interfitting mating surfaces with each comprised of at least one radially extending flat surface and at least one axially extending cylindrical surface, said mating surfaces being machined to a surface finish of about 125/200 r.m.s. along said interfitting faces and cleansed prior to application of flux,
   b. applying a brazing flux to said mating surfaces and arranging a brazing material on said mating surfaces, and
   c. placing said castings together with the braze and flux arranged surfaces interfitted, said interfitted portions being placed into a fixture for holding said interfitted castings together as an assembly with the brazing material sandwiched between said surfaces, and inserting said interfitted castings assembly into a furnace for heating said assembly at a temperature in the range of 1650°–1665° F for a time period effective to cause said brazing material to diffuse into each of said mated surfaces.

* * * * *